United States Patent
Fang et al.

(10) Patent No.: US 12,219,238 B2
(45) Date of Patent: Feb. 4, 2025

(54) AUTO FRAMING METHOD AND RELATED CAMERA APPARATUS

(71) Applicant: Altek Corporation, Hsinchu (TW)

(72) Inventors: Po-Wen Fang, Hsinchu (TW); Xiu-Hong Bian, Hsinchu (TW); Tsung-Hsien Lin, Hsinchu (TW)

(73) Assignee: Altek Corporation, Hsinchu (TW)

( * ) Notice: Subject to any disclaimer, the term of this patent is extended or adjusted under 35 U.S.C. 154(b) by 142 days.

(21) Appl. No.: 18/201,157

(22) Filed: May 23, 2023

(65) Prior Publication Data

US 2024/0223881 A1 Jul. 4, 2024

Related U.S. Application Data (60) Provisional application No. 63/435,812, filed on Dec. 29, 2022.

(51) Int. Cl.
*H04N 23/61* (2023.01)
*H04N 23/63* (2023.01)
*H04N 23/69* (2023.01)

(52) U.S. Cl.
CPC ........... *H04N 23/61* (2023.01); *H04N 23/635* (2023.01); *H04N 23/69* (2023.01)

(58) Field of Classification Search
CPC ....... H04N 23/69; H04N 23/61; H04N 23/635
USPC ....................................................... 348/222.1
See application file for complete search history.

(56) References Cited

U.S. PATENT DOCUMENTS

| | | | | |
|---|---|---|---|---|
| 8,169,463 | B2 * | 5/2012 | Enstad | H04N 21/4788 |
| | | | | 348/14.03 |
| 8,478,347 | B2 * | 7/2013 | Kim | H04N 23/69 |
| | | | | 455/90.3 |
| 9,323,432 | B2 * | 4/2016 | Kang | G06F 3/04842 |
| 10,104,338 | B2 * | 10/2018 | Goesnar | H04N 5/2226 |
| 10,460,159 | B1 * | 10/2019 | Shields | G06V 40/113 |
| 11,023,711 | B2 * | 6/2021 | Ranjan | G06F 18/217 |
| 11,048,919 | B1 * | 6/2021 | Modolo | G06V 20/40 |
| 11,128,795 | B2 * | 9/2021 | Youn | H04N 23/635 |
| 11,265,474 | B2 * | 3/2022 | Dolgin | H04N 23/69 |

(Continued)

FOREIGN PATENT DOCUMENTS

| | | |
|---|---|---|
| CN | 114078603 A | 2/2022 |
| CN | 115035555 A | 9/2022 |
| TW | 201613346 A | 4/2016 |

*Primary Examiner* — Pritham D Prabhakher
(74) *Attorney, Agent, or Firm* — Winston Hsu (57) ABSTRACT

An auto framing method is applied to a camera apparatus with an image receiver and a screen. The auto framing method includes receiving a detection image from the image receiver, computing a distance between the image receiver and an identification feature of the detection image, switching a framing mode of the screen into a normal mode or a single mode in accordance with a comparison result of the distance and a predefined distance threshold, setting a preset step count and a preset frame interval to compute a coordinate variation of the identification feature when position difference between a current focus area and a cropping area generated by the framing mode conforms to a predefined difference condition, and utilizing the coordinate variation to acquire an area variation of the cropping area, and scaling the cropping area to a target resolution for displaying on the screen in accordance with the area variation.

20 Claims, 7 Drawing Sheets

(56) References Cited

U.S. PATENT DOCUMENTS

| | | | |
|---|---|---|---|
| 11,671,701 B2* | 6/2023 | Youn | H04N 23/687 |
| | | | 348/222.1 |
| 11,700,445 B2* | 7/2023 | Vaezi Joze | G06F 18/24323 |
| | | | 348/222.1 |
| 11,979,441 B2* | 5/2024 | Yu | G06V 10/70 |
| 12,125,210 B2* | 10/2024 | Wu | G06V 40/20 |
| 2014/0358704 A1* | 12/2014 | Banerjee | G06Q 20/405 |
| | | | 705/16 |
| 2016/0132890 A1* | 5/2016 | Banerjee | G06Q 20/4014 |
| | | | 705/44 |
| 2016/0277712 A1* | 9/2016 | Michot | G06T 7/20 |
| 2018/0063482 A1* | 3/2018 | Goesnar | H04N 23/58 |
| 2018/0268228 A1* | 9/2018 | Okada | G06V 40/103 |
| 2020/0267313 A1* | 8/2020 | Youn | H04N 23/632 |
| 2021/0289140 A1* | 9/2021 | Dolgin | H04N 23/69 |
| 2022/0006951 A1* | 1/2022 | Youn | H04N 23/64 |
| 2022/0270343 A1* | 8/2022 | Wu | G06T 7/194 |
| 2022/0343681 A1 | 10/2022 | Zhou | |
| 2022/0375259 A1 | 11/2022 | Banerjee | |
| 2023/0133854 A1* | 5/2023 | Vaezi Joze | G06F 18/2163 |
| | | | 348/222.1 |
| 2023/0379567 A1* | 11/2023 | Schaefer | G03B 17/565 |

* cited by examiner

AUTO FRAMING METHOD AND RELATED CAMERA APPARATUS

CROSS REFERENCE TO RELATED APPLICATIONS

This application claims the benefit of U.S. Provisional Application No. 63/435,812, filed on Dec. 29, 2022. The content of the application is incorporated herein by reference.

BACKGROUND OF THE INVENTION

1. Field of the Invention

The present invention relates to an auto framing method and related camera apparatus, and more particularly, to an auto framing method and related camera apparatus with preferred performance.

2. Description of the Prior Art

A conventional surveillance camera only has one framing mode, such as a human face mode or a human body mode. The human face mode detects a facial feature within the field of view, and enlarges the facial feature according to a specific ratio to make the facial feature identifiable on the display screen. The human body mode detects a body feature within the field of view, and enlarges the body feature according to the specific ratio to make the body feature identifiable on the display screen. Therefore, the conventional surveillance camera does not provide switchable selection of the human face mode and the human body mode, and cannot identify a distance between the detected object and the camera for automatically switching into the human face mode or the human body mode.

SUMMARY OF THE INVENTION

The present invention provides an auto framing method and related camera apparatus with preferred performance for solving above drawbacks.

According to the claimed invention, an auto framing method is applied to a camera apparatus with an image receiver and a screen. The auto framing method includes receiving a detection image from the image receiver, computing a feature distance between the image receiver and at least one identification feature of the detection image, switching a framing mode of the screen into a normal mode or a single mode in accordance with a comparison result of the feature distance and a predefined distance threshold, setting a preset step count and a preset frame interval to compute a coordinate variation of the identification feature when position difference between a current focus area and a cropping area generated by the framing mode conforms to a predefined difference condition, and utilizing the coordinate variation to acquire an area variation of the cropping area, and scaling the cropping area to a target resolution for displaying on the screen in accordance with the area variation.

According to the claimed invention, the auto framing method further includes determining whether an object detection result of the detection image is located inside a previous boundary, and analyzing the detection image to search the identification feature when the object detection result is located inside the previous boundary. The auto framing method further includes determining whether an object confidence parameter of the detection image exceeds a predefined confidence threshold, and analyzing the detection image to search the identification feature when the object confidence parameter exceeds the predefined confidence threshold. The auto framing method further includes determining whether a disappearance time of the identification feature inside the detection image exceeds a predefined period, and adjusting the cropping area to focus on a full field of view of the image receiver for displaying on the screen when the disappearance time exceeds the predefined period.

According to the claimed invention, the auto framing method further includes switching the framing mode into the normal mode when the feature distance is greater than or equal to the predefined distance threshold, drawing a marking frame to contain all identification features of the detection image, and adjusting the marking frame to define the cropping area in accordance with a preset aspect ratio of the screen. The auto framing method further includes switching the framing mode into the single mode when the feature distance is smaller than the predefined distance threshold, and counting a number of the identification feature inside the detection image.

According to the claimed invention, the auto framing method further includes drawing a marking frame by the identification feature when the detection image has the single identification feature, and adjusting the marking frame to define the cropping area in accordance with a preset aspect ratio of the screen. The auto framing method further includes drawing a marking frame by adjacent identification features when the detection image has a plurality of identification features, and adjusting the marking frame to define the cropping area in accordance with a preset aspect ratio of the screen. The auto framing method further includes setting the preset step count in accordance with an animation time of the cropping area, and/or setting the preset frame interval in accordance with an animation speed of the cropping area.

According to the claimed invention, a camera apparatus with an auto framing function includes an image receiver, a screen and an operation processor. The image receiver is adapted to receive a detection image. The operation processor electrically connected to the image receiver and the screen in a wire manner or in a wireless manner, the operation processor computing a feature distance between the image receiver and at least one identification feature of the detection image, switching a framing mode of the screen into a normal mode or a single mode in accordance with a comparison result of the feature distance and a predefined distance threshold, setting a preset step count and a preset frame interval to compute a coordinate variation of the identification feature when position difference between a current focus area and a cropping area generated by the framing mode conforms to a predefined difference condition, and utilizing the coordinate variation to acquire an area variation of the cropping area, and scaling the cropping area to a target resolution for displaying on the screen in accordance with the area variation.

The auto framing method and the camera apparatus of the present application can simultaneously detect one or several objects appeared in the visual field, and can be switched into the human face detection or the human body detection automatically in accordance with the relative distance between the object and the camera apparatus. In some possible embodiment, the camera apparatus can generate two images with different sizes when acquiring the detection image. The small size image can be analyzed and computed by the auto framing method of the present application to find out the identification feature inside the frame and draw the range of the cropping area, and the large size image can be processed to mark and enlarge the cropping area for being displayed on the screen. The auto framing method of the present application can compare each detection image with the previous detection image or the target image, and set the number of frames in which the auto framing animation is completed and further set how many frames is changed in the auto framing animation, and further set the auto framing animation is generated when the position change of results of the human face detection or the human body detection is over the predefined difference condition, so as to improve smoothness of the auto framing animation for preferred animation quality.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
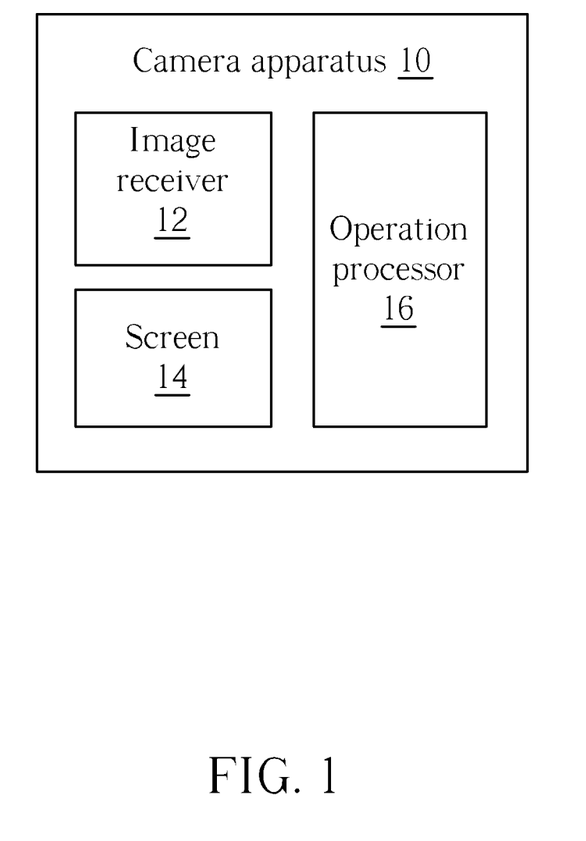
FIG. 1 is a functional block diagram of a camera apparatus according to an embodiment of the present application.
Figure 2:
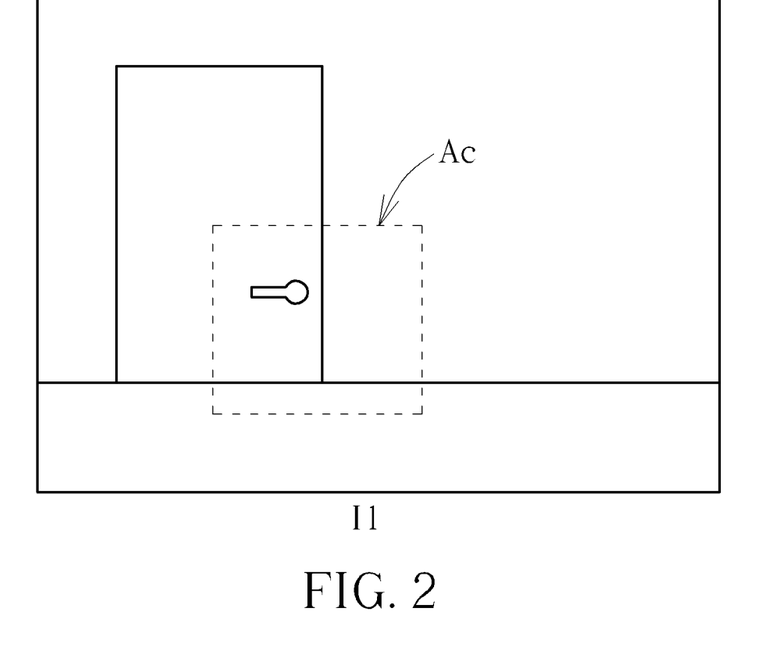
FIG. 2 is a diagram of a detection image with a full field of view according to the embodiment of the present application.
Figure 3:
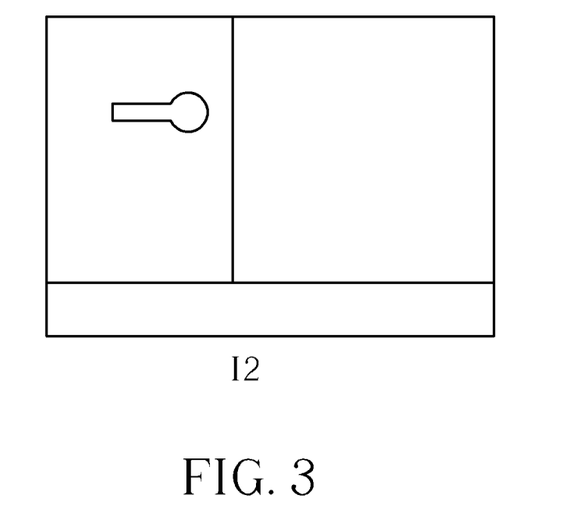
FIG. 3 is a diagram of a detection image with a specific field of view according to the embodiment of the present application.

Please refer to FIG. 1 to FIG. 3. FIG. 1 is a functional block diagram of a camera apparatus 10 according to an embodiment of the present application. FIG. 2 is a diagram of a detection image I1 with a full field of view according to the embodiment of the present application. FIG. 3 is a diagram of a detection image 12 with a specific field of view according to the embodiment of the present application. The camera apparatus 10 can be a surveillance camera installed outdoors, or a network camera installed indoors, or a camera module of a computer device. The camera apparatus 10 can include an image receiver 12, a screen 14 and an operation processor 16 electrically connected with each other in a wire manner or in a wireless manner. The image receiver 12 can capture the detection image I1, or can receive the detection image I1 captured by an external camera, as shown in FIG. 2. The operation processor 16 can utilize an auto framing function of the present application to analyze and adjust the detection image I1, and display an analysis and adjustment result on the screen 14. The foresaid analysis and adjustment result can be a focused area within the detection image I1, as shown in FIG. 3, and a position and a range of the focused area can depend on a detection result of the auto framing function.

Figure 4A:
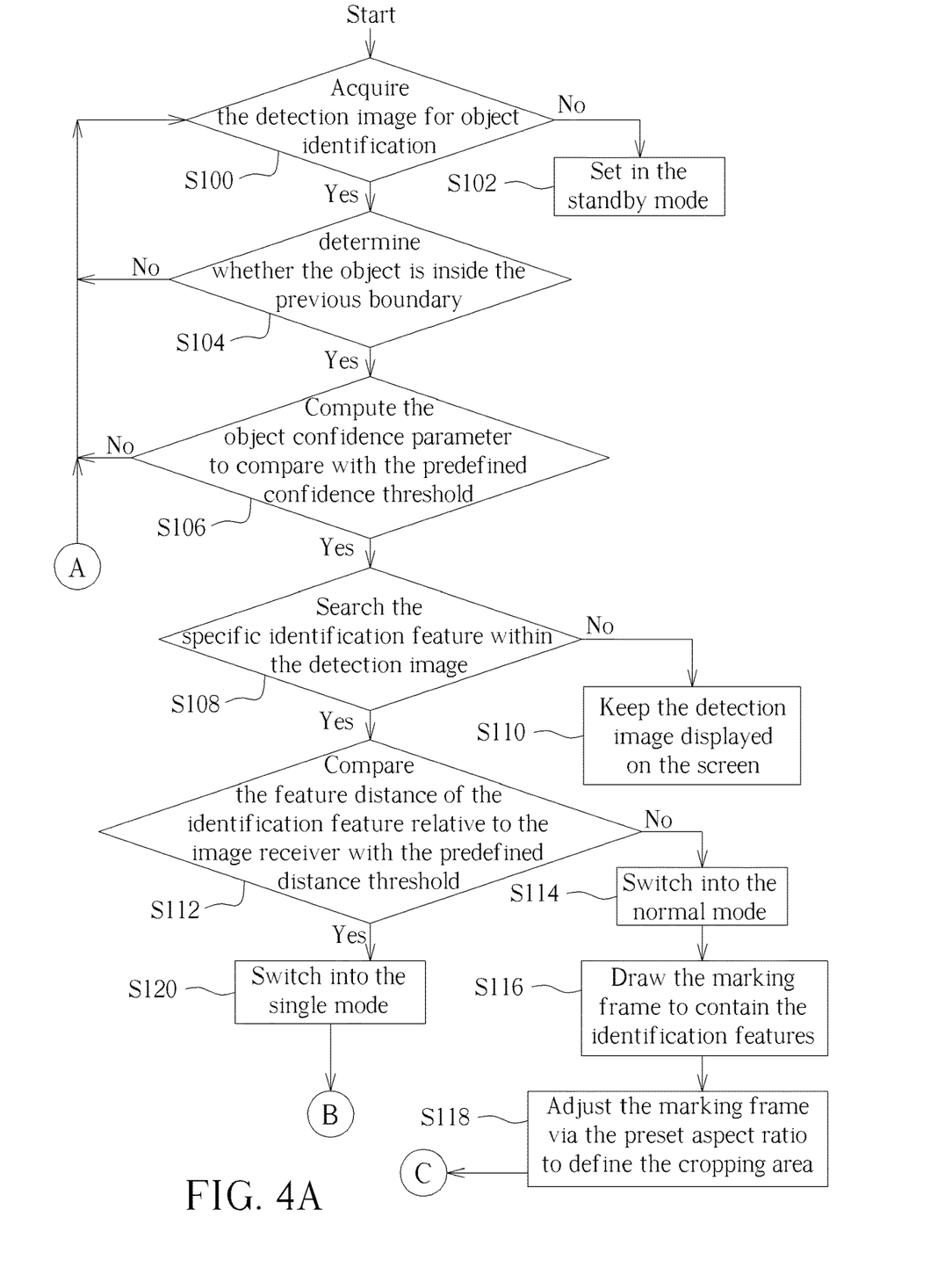
FIG. 4A and FIG. 4B are flow charts of an auto framing method according to the embodiment of the present application.
Figure 4B:
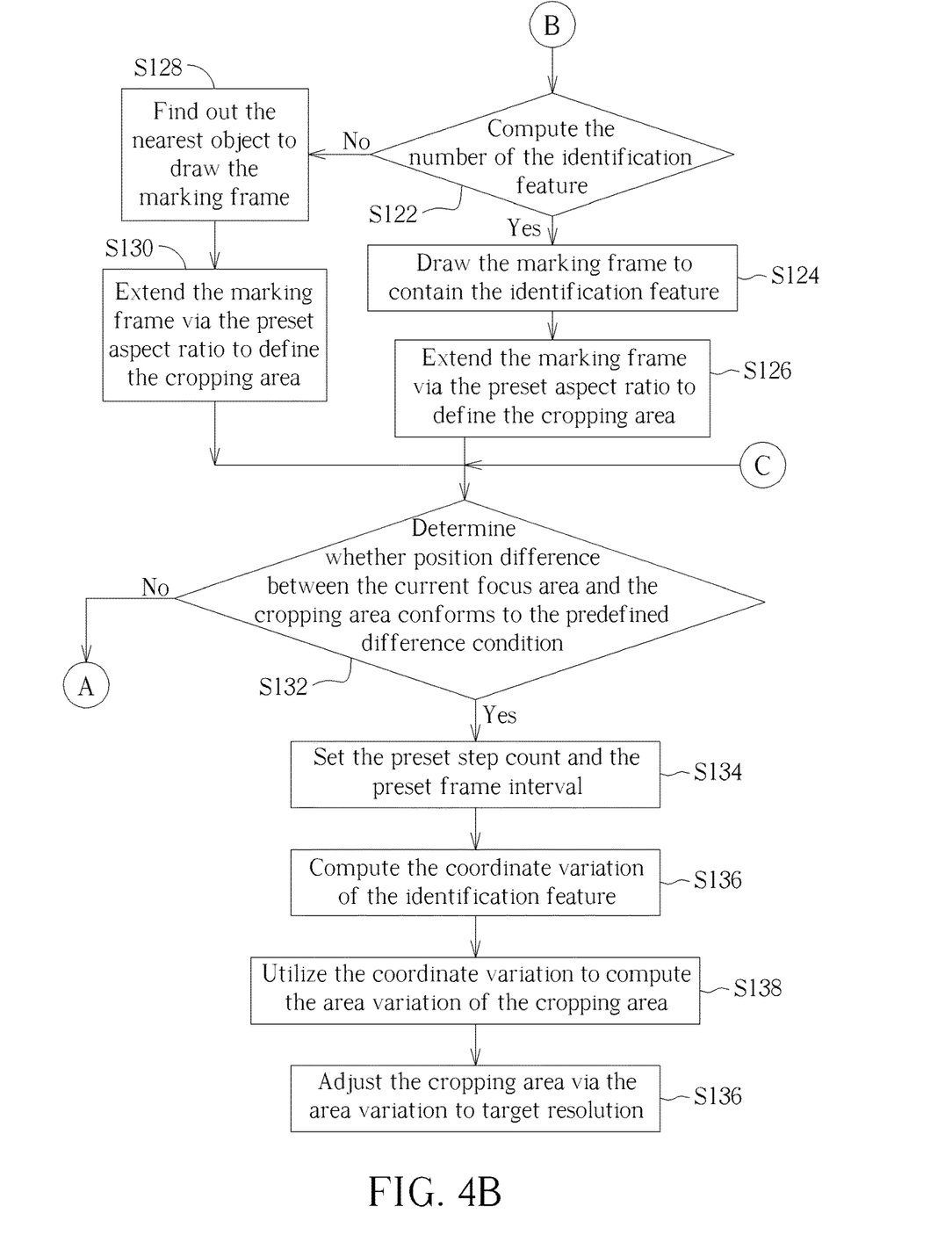
Figure 5:
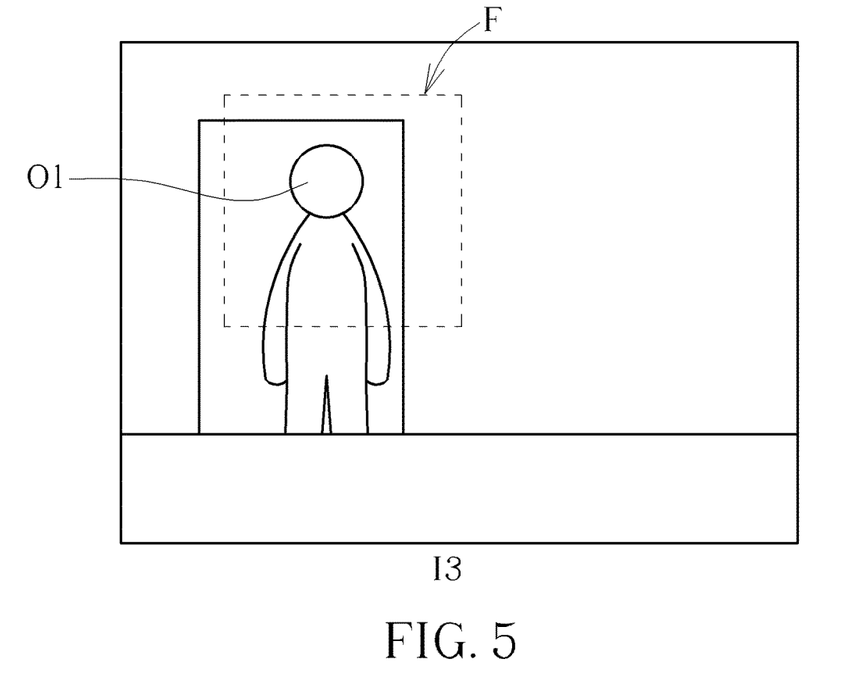
FIG. 5 to FIG. 10 are diagrams of the detection image transformed into different steps according to the embodiment of the present application.
Figure 6:
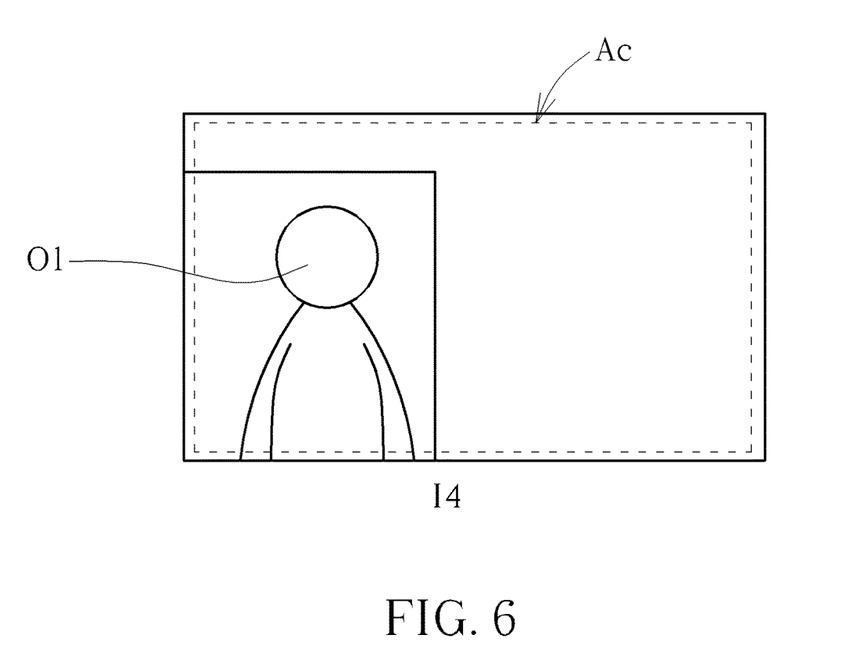
Figure 7:
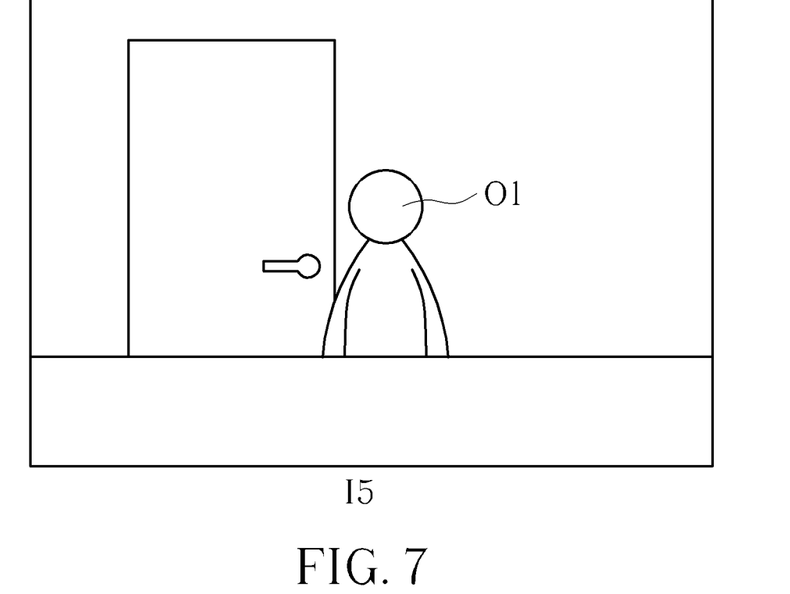

Please refer to FIG. 4A and FIG. 4B to FIG. 10. FIG. 4A and FIG. 4B are flow charts of an auto framing method according to the embodiment of the present application. FIG. 5 to FIG. 10 are diagrams of the detection image I1 transformed into different steps according to the embodiment of the present application. The auto framing method illustrated in FIG. 4A and FIG. 4B can be suitable for the camera apparatus 10 shown in FIG. 1. In the embodiment, the desk and the door of the meeting room can be noticed in the detection image I1 with the full field, as shown in FIG. 2, and there may have no object existed in the meeting room. If the object O1 (such as one person) walks into the door, such as the detection image I3 shown in FIG. 5, the auto framing method of the present application can detect a specific identification feature and then accordingly change a visual field (which may be indicated as the foresaid focused area) of the screen 14 to highlight the identification feature of the object O1, such as the detection image 14 shown in FIG. 6. When the object O1 moves, the person may be distant from the door and sit in front of the desk, the auto framing method of the present application can change the visual field in accordance with variation of a distance of the identification feature relative to the image receiver 12, such as the detection image 15 shown in FIG. 7.

Figure 8:
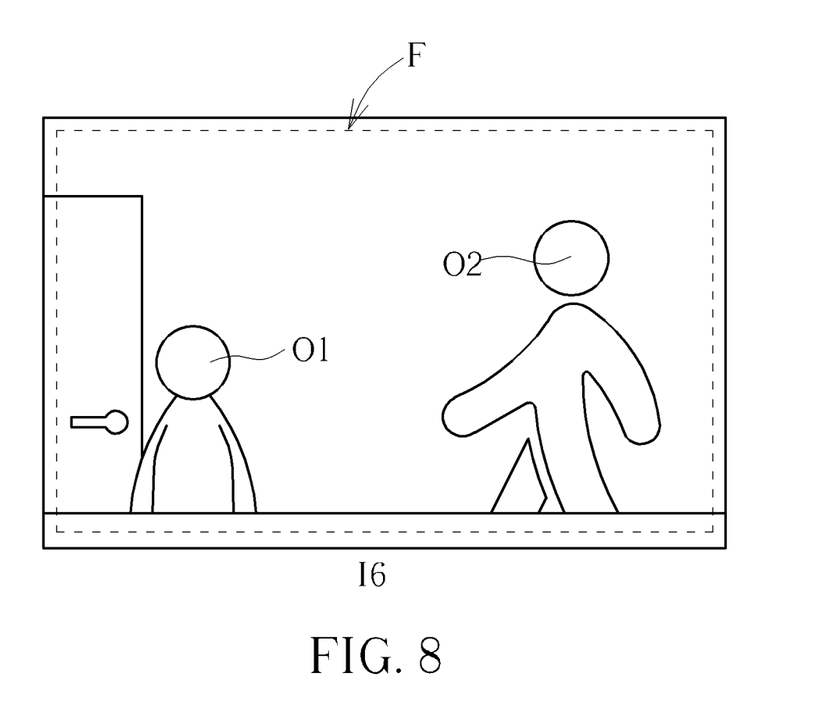
Figure 9:
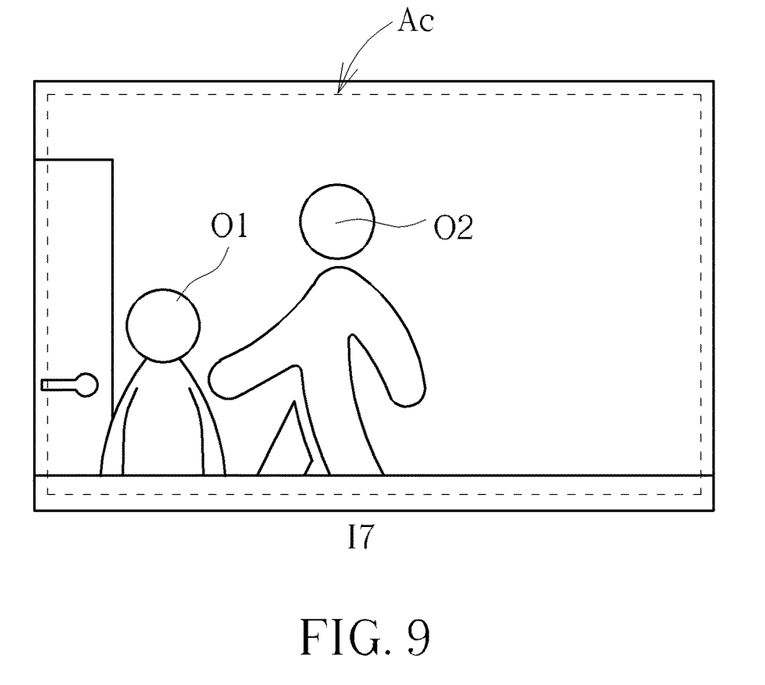
Figure 10:
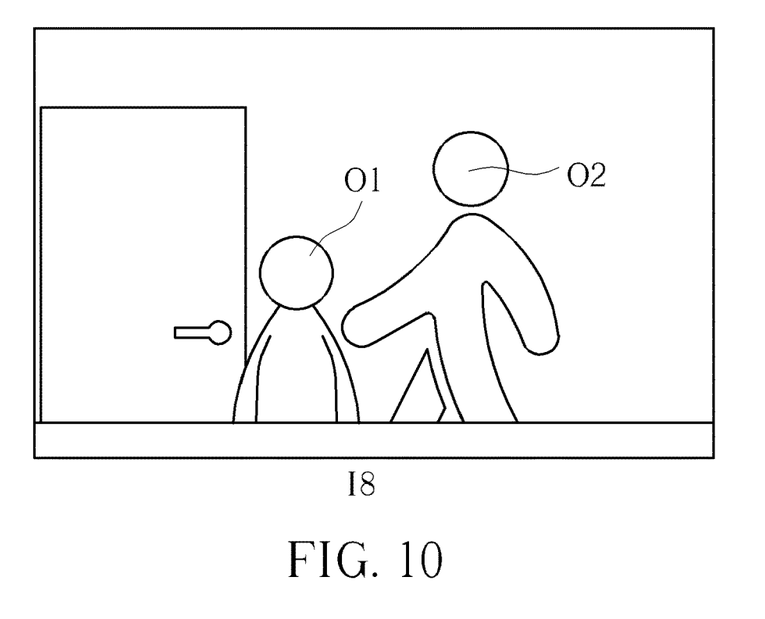

If another object O2 walks into the visual field, the auto framing method of the present application can immediately find out the identification features of the objects O1 and O2, and adjust the visual field to move a middle point or a specific computed point of the foresaid two identification features on a frame center of the screen 14, such as the detection image 16 shown in FIG. 8. When the object O2 moves, the auto framing method of the present application can still adjust the visual field by moving the middle point or the specific computed point of the foresaid two identification features on the frame center of the screen 14, or adjust the visual field only based on the identification feature of the object O2 immediately, such as the detection image 17 shown in FIG. 9. When the object O2 is positioned on a predefined location or stops moving, the auto framing method of the present application can define the final visual field by setting the middle point or the specific computed point of the foresaid two identification features on the frame center of the screen 14, so that the identification features of the objects O1 and O2 can be clearly observed during the appearance and movement of the objects O1 and O2, such as the detection image 18 shown in FIG. 10.

In the auto framing method of the present application, step S100 can be executed to acquire the detection image I1 for object identification; the object identification can be human face detection and/or human body detection. If the auto framing method is executed initially, step S100 can apply the object identification for the detection image I1 with the full field of view; the detection image I1 with the full field of view may contain the largest visual field of the meeting room. If the auto framing method is executed for a period of time, step S100 may apply the object identification for a cropping area Ac (within the detection image I1) generated by the auto framing method in a previous stage, or may still apply the object identification for the detection image I1 with the full field of view. For example, the detection image 12 shown in FIG. 3 can be an execution result of the cropping area Ac generated by a specific framing mode in the auto framing method of the present application, and have the visual field focused on the doorknob. If there is no object detected, step S102 can be executed to set in a standby mode. If the object is detected, step S104 can be optionally executed to determine whether an object detection result is inside a previous boundary; the foresaid previous boundary can be a boundary generated by the auto framing method when analyzing the previous detection image, or can be a boundary generated by the auto framing method in accordance with a predefined condition, which depends on the design demand.

If the object detection result is outside the previous boundary, the object may enter the visual field of the camera apparatus 10 but still be outside a region of interest of the camera apparatus 10, or only a part of the object is inside the foresaid region of interest, so that step S100 can be executed accordingly. If the object detection result is inside the previous boundary, step S106 can be executed to compute an object confidence parameter of the object detection result to compare with a predefined confidence threshold. The object confidence parameter can be interpreted as a degree of an identification result or a classification result of the object meeting an expected condition, and an actual value of the predefined confidence threshold can depend on the design demand. If the object confidence parameter is equal to or smaller than the predefined confidence threshold, the object detection result has low quality or the object does not look like the predefined target, so that step S100 can be executed accordingly. If the object confidence parameter is greater than the predefined confidence threshold, step S108 can be executed to search the specific identification feature within the detection image I1, such as the human face. If the identification feature cannot be found in the detection image I1 and a disappearance time of the identification feature exceeds a predefined period, the object may be departed from the visual field, or the object may go through the visual field but does not show the face, so that step S110 can be executed to keep the detection image I1 with the full field of view being displayed on the screen 14.

It should be mentioned that if step S108 searches the identification feature within the detection image with the non-full field of view, such as the detection image 12 shown in FIG. 3, step S110 can keep the detection image 12 with the specific field of view, or the cropping area Ac from the detection image I1 (as mentioned above, the visual field of the detection image 12 may be the same as the visual field of the cropping area Ac generated by the auto framing method in the specific framing mode) being displayed on the screen 14 when the identification feature cannot be found in the detection image 12 and the disappearance time of the identification feature exceeds the predefined period. In the present application, the predefined period can be set as four seconds, and may be changed in accordance with the design demand.

If the identification feature can be found in the detection image I1, step S112 can be executed to compute a feature distance of the identification feature relative to the image receiver 12 for comparing with a predefined distance threshold. In the embodiment, the predefined distance threshold may be set as one meter, and an actual value of the predefined distance threshold can depend on the design demand and be varied in accordance with framing requirements and a size of environment detected by the camera apparatus 10. When the feature distance is greater than or equal to the predefined distance threshold, step S114 can be executed to switch the framing mode of the screen 14 into a normal mode; for example, the object O1 shown in FIG. 5 may be more than one meter away from the image receiver 12, and the object O2 shown in FIG. 8 may be more than one meter away from the image receiver 12. Then, step S116 and step S118 can be executed to draw a marking frame F by containing all the identification features, and adjust the marking frame F to define the cropping area Ac in accordance with a preset aspect ratio of the screen 14. Generally, the marking frame F is a virtual line and not displayed on the screen 14. The marking frame F can contain one or several identification features, such as the identification feature of the object O1 shown in FIG. 5 and the identification features of the objects O1 and O2 shown in FIG. 8. The marking frame F can be drawn by a number and relative positions of the identification features, and then be extended to conform to the preset aspect ratio (about 16:9 or 4:3) of the screen 14 for generating the cropping area Ac. The cropping area Ac can be further scaled up in accordance with the size of the screen 14 to be directly displayed on the screen 14 in a full screen mode, such as the embodiment shown in FIG. 6.

In the embodiment shown in FIG. 8, the marking frame F can be extended to generate and scale up the cropping area Ac in step S118; however, the identification features between the objects O1 and O2 shown in FIG. 8 are distant from each other, so that the marking frame F and the cropping area Ac may have the wider range and a zooming effect is not obvious. The embodiment in FIG. 9 can show a situation of the object O2 moved close to the object O1 for preferred performance.

If the feature distance is smaller than the predefined distance threshold, the object may be appeared in the visual field by closing to the image receiver 12, so the foresaid object is applied for executing step S120 and step S122, to switch the framing mode of the screen 14 into a single mode and compute a number of the identification feature. If the number of the identification feature is single, step S124 and step S126 can be executed to draw the marking frame F by containing the identification feature, and extend the marking frame F in accordance with the preset aspect ratio of the screen 14 for defining the cropping area Ac, and the cropping area Ac can be scaled up in accordance with the size of the screen 14 to be displayed on the screen 14 in the full screen mode. If the number of the identification feature is plural, step S128 and step S130 can be executed to find out one or some nearest objects within the visual field for drawing the marking frame F, and then extend the marking frame F in accordance with the preset aspect ratio of the screen 14 for defining the cropping area Ac, and scale up the cropping area Ac in accordance with the size of the screen 14 to be displayed on the screen 14 in the full screen mode.

After execution of step S118, step 126 and step S130, the auto framing method can execute step S132 to determine whether a position difference between a current focus area and the cropping area Ac generated by the framing mode (such as the normal mode or the single mode) conforms to a predefined difference condition. The current focus area may be indicated as another cropping area from the previous detection image generated by the auto framing method. The position difference can be used to identify whether the object has obvious change between the current detection image and the previous detection image. The present application can generate an auto framing animation when the change of the object is obvious, and the user can see variation of the object within the visual field via the auto framing animation; the present application does not generate the auto framing animation to keep preferred observation quality when the change of the object is ambiguous. In the embodiment, the predefined difference condition may be set as ten percentages, and an actual value of the predefined difference condition can depend on the design demand.

Therefore, if the position difference does not conform to the predefined difference condition, the cropping area Ac generated by the auto framing method may be slightly changed relative to the current focus area, so step S100 can be executed for a next stage of detection. If the position difference conforms to the predefined difference condition, step S134 can be executed to set a preset step count and a preset frame interval. The preset step count can be interpreted as a period of time of the auto framing animation, or a number of the frames whenever the auto framing animation is completed. The animation time of the cropping area Ac can be interpreted as the period of time from initial detection to stationary location of the object; therefore, the preset step count can be optionally set in accordance with the animation time of the cropping area. For example, the preset step count may be set as sixty frames, and the auto framing method can complete the auto framing animation within sixty frames. The preset frame interval can be interpreted as time difference between one analyzed frame and another analyzed frame, and can be used to adjust a playback speed of the auto framing animation; an animation speed of the cropping area can be interpreted as a movement speed from the initial detection to the stationary location of the object, so that the preset frame interval can be optionally set in accordance with the animation speed of the cropping area. For example, the image analysis may be performed every two frames.

Then, step S136, step S138 and step S140 can be executed to compute a coordinate variation of the identification feature, and utilize the coordinate variation to compute an area variation of the cropping area, so as to adjust the cropping area in accordance with the area variation for conforming to target resolution. With the movement of the object O1 or O2, the image receiver 12 can continuously acquire or capture the plurality of detection images, such as thirty frames per second. The movement of the object O1 or O2 can accordingly change the coordinates of the identification feature of the objects O1 or O2 within the frame on the screen 14. Difference between the coordinates of the identification feature on each detection image and the coordinates of the identification feature on the previous detection image (or another target image) can be interpreted as the coordinate variation of the identification feature. Accordingly, the cropping area Ac generated by each detection image may have dimensional and/or shaped difference relative to the cropping area Ac generated by the previous detection image (or another target image), which can be interpreted as the area variation of the cropping area. Therefore, the auto framing method of the present application can compute the coordinate variation of the identification feature and the area variation of the cropping area Ac within the detection image frame by frame in accordance with the preset step count; when the detection image is analyzed, the auto framing method of the present application can compute the coordinate variation of the identification feature and the area variation of the cropping area Ac within another detection image in accordance with the preset frame interval, so as to determine whether to scale the cropping area Ac or to scale up the cropping area Ac to the target resolution for being displayed on the screen 14 to form the auto framing animation.

In conclusion, the auto framing method and the camera apparatus of the present application can simultaneously detect one or several objects appeared in the visual field, and can be switched into the human face detection or the human body detection automatically in accordance with the relative distance between the object and the camera apparatus. In some possible embodiment, the camera apparatus can generate two images with different sizes when acquiring the detection image. The small size image can be analyzed and computed by the auto framing method of the present application to find out the identification feature inside the frame and draw the range of the cropping area, and the large size image can be processed to mark and enlarge the cropping area for being displayed on the screen. The auto framing method of the present application can compare each detection image with the previous detection image or the target image, and set the number of frames in which the auto framing animation is completed and further set how many frames is changed in the auto framing animation, and further set the auto framing animation is generated when the position change of results of the human face detection or the human body detection is over the predefined difference condition, so as to improve smoothness of the auto framing animation for preferred animation quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An auto framing method applied to a camera apparatus with an image receiver and a screen, the auto framing method comprising:
   receiving a detection image from the image receiver;
   computing a feature distance between the image receiver and at least one identification feature of the detection image;
   switching a framing mode of the screen into a normal mode or a single mode in accordance with a comparison result of the feature distance and a predefined distance threshold;
   setting a preset step count and a preset frame interval to compute a coordinate variation of the identification feature when position difference between a current focus area and a cropping area generated by the framing mode conforms to a predefined difference condition; and
   utilizing the coordinate variation to acquire an area variation of the cropping area, and scaling the cropping area to a target resolution for displaying on the screen in accordance with the area variation.

2. The auto framing method of claim 1, further comprising:
   determining whether an object detection result of the detection image is located inside a previous boundary; and
   analyzing the detection image to search the identification feature when the object detection result is located inside the previous boundary.

3. The auto framing method of claim 1, further comprising:
   determining whether an object confidence parameter of the detection image exceeds a predefined confidence threshold; and
   analyzing the detection image to search the identification feature when the object confidence parameter exceeds the predefined confidence threshold.

4. The auto framing method of claim 1, further comprising:
   determining whether a disappearance time of the identification feature inside the detection image exceeds a predefined period; and
   adjusting the cropping area to focus on a full field of view of the image receiver for displaying on the screen when the disappearance time exceeds the predefined period.

5. The auto framing method of claim 1, further comprising:
switching the framing mode into the normal mode when the feature distance is greater than or equal to the predefined distance threshold;
drawing a marking frame to contain all identification features of the detection image; and
adjusting the marking frame to define the cropping area in accordance with a preset aspect ratio of the screen.

6. The auto framing method of claim 1, further comprising:
switching the framing mode into the single mode when the feature distance is smaller than the predefined distance threshold; and
counting a number of the identification feature inside the detection image.

7. The auto framing method of claim 6, further comprising:
drawing a marking frame by the identification feature when the detection image has the single identification feature; and
adjusting the marking frame to define the cropping area in accordance with a preset aspect ratio of the screen.

8. The auto framing method of claim 6, further comprising:
drawing a marking frame by adjacent identification features when the detection image has a plurality of identification features; and
adjusting the marking frame to define the cropping area in accordance with a preset aspect ratio of the screen.

9. The auto framing method of claim 1, further comprising:
setting the preset step count in accordance with an animation time of the cropping area.

10. The auto framing method of claim 1, further comprising:
setting the preset frame interval in accordance with an animation speed of the cropping area.

11. A camera apparatus with an auto framing function, comprising:
an image receiver adapted to receive a detection image;
a screen; and
an operation processor electrically connected to the image receiver and the screen in a wire manner or in a wireless manner, the operation processor computing a feature distance between the image receiver and at least one identification feature of the detection image, switching a framing mode of the screen into a normal mode or a single mode in accordance with a comparison result of the feature distance and a predefined distance threshold, setting a preset step count and a preset frame interval to compute a coordinate variation of the identification feature when position difference between a current focus area and a cropping area generated by the framing mode conforms to a predefined difference condition, and utilizing the coordinate variation to acquire an area variation of the cropping area, and scaling the cropping area to a target resolution for displaying on the screen in accordance with the area variation.

12. The camera apparatus of claim 11, wherein the operation processor further determines whether an object detection result of the detection image is located inside a previous boundary, and analyzes the detection image to search the identification feature when the object detection result is located inside the previous boundary.

13. The camera apparatus of claim 11, wherein the operation processor further determines whether an object confidence parameter of the detection image exceeds a predefined confidence threshold, and analyzes the detection image to search the identification feature when the object confidence parameter exceeds the predefined confidence threshold.

14. The camera apparatus of claim 11, wherein the operation processor further determines whether a disappearance time of the identification feature inside the detection image exceeds a predefined period, and adjusts the cropping area to focus on a full field of view of the image receiver for displaying on the screen when the disappearance time exceeds the predefined period.

15. The camera apparatus of claim 11, wherein the operation processor further switches the framing mode into the normal mode when the feature distance is greater than or equal to the predefined distance threshold, draws a marking frame to contain all identification features of the detection image, and adjusts the marking frame to define the cropping area in accordance with a preset aspect ratio of the screen.

16. The camera apparatus of claim 11, wherein the operation processor further switches the framing mode into the single mode when the feature distance is smaller than the predefined distance threshold, and counts a number of the identification feature inside the detection image.

17. The camera apparatus of claim 16, wherein the operation processor further draws a marking frame by the identification feature when the detection image has the single identification feature, and adjusts the marking frame to define the cropping area in accordance with a preset aspect ratio of the screen.

18. The camera apparatus of claim 16, wherein the operation processor further draws a marking frame by adjacent identification features when the detection image has a plurality of identification features, and adjusts the marking frame to define the cropping area in accordance with a preset aspect ratio of the screen.

19. The camera apparatus of claim 11, wherein the operation processor further sets the preset step count in accordance with an animation time of the cropping area.

20. The camera apparatus of claim 11, wherein the operation processor further sets the preset frame interval in accordance with an animation speed of the cropping area.

* * * * *